(12) United States Patent
Nasiri et al.

(10) Patent No.: US 7,258,011 B2
(45) Date of Patent: Aug. 21, 2007

(54) MULTIPLE AXIS ACCELEROMETER

(75) Inventors: Steven S. Nasiri, Saratoga, CA (US);
Joseph Seeger, Menlo Park, CA (US)

(73) Assignee: InvenSense Inc., Santa Clara, CA (US)

( * ) Notice: Subject to any disclaimer, the term of this patent is extended or adjusted under 35 U.S.C. 154(b) by 0 days.

(21) Appl. No.: 11/285,493

(22) Filed: Nov. 21, 2005

(65) Prior Publication Data

US 2007/0113653 A1   May 24, 2007

(51) Int. Cl.
*G01P 15/125* (2006.01)

(52) U.S. Cl. .................. 73/514.32; 73/510; 73/514.38

(58) Field of Classification Search ............ 73/514.32, 73/514.36, 514.38, 514.29, 510, 511, 514.18, 73/514.24; 361/280
See application file for complete search history.

(56) References Cited

U.S. PATENT DOCUMENTS

| | | | |
|---|---|---|---|
| 4,967,605 A | 11/1990 | Okada | |
| 5,487,305 A * | 1/1996 | Ristic et al. | 73/514.32 |
| 5,894,091 A * | 4/1999 | Kubota | 73/504.12 |
| 6,148,670 A * | 11/2000 | Judy | 73/514.32 |
| 6,149,190 A | 11/2000 | Galvin et al. | |
| 6,504,385 B2 * | 1/2003 | Hartwell et al. | 324/662 |
| 6,705,167 B2 | 3/2004 | Kvisteroey et al. | |
| 6,845,670 B1 * | 1/2005 | McNeil et al. | 73/514.32 |

* cited by examiner

*Primary Examiner*—Helen C. Kwok
(74) *Attorney, Agent, or Firm*—Sawyer Law Group LLP

(57) ABSTRACT

A sensor for measuring acceleration in three mutually orthogonal axes, X, Y and Z is disclosed. The sensor comprises a sensor subassembly. The sensor subassembly further comprises a base which is substantially parallel to the X-Y sensing plane; a proof mass disposed in the X-Y sensing plane and constrained to move substantially in the X, Y, and Z, about by at least one linkage and is responsive to accelerations in the X, Y and Z directions. The sensor includes at least one paddle disposed in the sensing plane; and at least one pivot on the linkage. Finally, the sensor includes at least one electrode at the base plate and at least one transducer for each sensing direction of the sensor subassembly responsive to the acceleration.

50 Claims, 8 Drawing Sheets

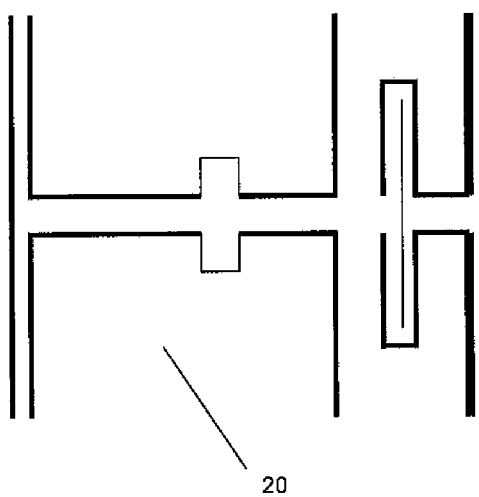 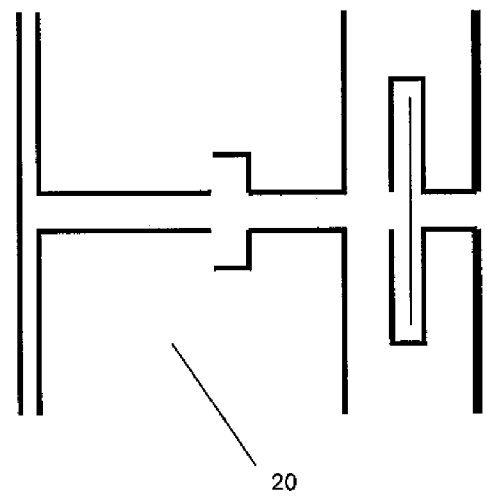
FIG. 4A  FIG. 4B

MULTIPLE AXIS ACCELEROMETER

FIELD OF THE INVENTION

The present invention relates generally to accelerometers and more specifically to multiple axis accelerometers.

BACKGROUND OF THE INVENTION

Many applications require the ability to sense acceleration and rate of rotation along three mutually orthogonal axes. In attempts to commercialize inertial measurement units for non-military applications, the cost and size of accelerometers have been addressed by various means. Sensing structures include capacitive devices as well as piezoresistive devices constructed using semiconductor manufacturing techniques. The capacitive devices are inherently less sensitive to temperature variations as they do not employ a resistance change which is highly sensitive to temperature. However, the electronics for a capacitive sensor are typically more complex.

Capacitive devices generally include a proof mass which is mounted on a substrate. Electrodes are positioned in directions of interest to sense the deflection induced by acceleration imposed on to the proof mass. These electrodes are located in the plane of the proof mass to provide X and Y detection as well as on the substrate surface to provide sensing in the Z direction or normal to the substrate surface. The deflection of the proof mass causes capacitances to change. This change is sensed by electronic circuits that provide a signal which is representative of the acceleration.

Performance of the accelerometer is driven by the fundamental frequency or modes of the structure and the sensitivity of the electronics. The movement to ever increasing miniaturization has imposed a greater challenge to the electronics. The ability to position and connect the electronics in close proximity with the position sensitive capacitors is critical to the performance of the circuit and consequently the performance of the accelerometer.

Micromachining of silicon has been utilized to produce both single axis and multiple axes sensors using compact form factors. A typical configuration includes a semiconductor layer interleaved between two highly insulating substrates such as glass. The glass does not introduce significant parasitic capacitances allowing the routing of the acceleration induced capacitance change to an external board electronics. This, however, poses some packaging challenges and consumes lateral space.

An approach is needed to satisfy the desire for a highly compact multiaxis accelerometer with good performance. An efficient utilization of space for both the mechanical sensing element as well as the electronics is desired. There are several challenges that must be met to realize a 3 axis accelerometer suitable for commercial inertial measurement applications. There are no known solutions to the problem of a 3 axis accelerometer compatible with a low cost multi-axes gyro. Many of these challenges have been met on an individual basis but not collectively in a single embodiment.

Compatibility with rate sensing sensors is an additional attraction on the path to an inertial measurement unit where six degrees of freedom are measured—3 orthogonal accelerations and 3 rate of rotation axes.

Accordingly, what is needed is a system and method for overcoming the above-identified problems. The present invention addresses such a need.

SUMMARY OF THE INVENTION

A sensor for measuring acceleration in three mutually orthogonal axes, X, Y and Z is disclosed. The sensor comprises a sensor subassembly. The sensor subassembly further comprises a base which is substantially parallel to the X-Y sensing plane; a proof mass disposed in the X-Y sensing plane and constrained to move substantially in the X, Y, and Z, by at least one linkage and is responsive to accelerations in the X, Y and Z directions. The sensor includes at least one paddle disposed in the sensing plane; and at least one pivot on the linkage. Finally, the sensor includes at least one electrode at the base plate and at least one transducer for each sensing direction of the sensor subassembly responsive to the acceleration.

A system and method in accordance with the present invention allows the sensing of acceleration along three mutually orthogonal directions and meets the following design and manufacturing goals:

Compact sensing element capable of detecting acceleration in three directions

Compact support electronic circuitry

Minimal parasitic capacitance to optimize electronics performance

Low noise highly sensitive electronics

Sensing element to support differential capacitance measurements

Means of over-travel protection against shock in all directions

Cost efficient means of assembly to protect sensing element and to integrate electronics Compatible means of fabrication with rate of rotation sensing devices (gyros)

BRIEF DESCRIPTION OF THE DRAWINGS

FIGS. 4a, 4b and 5a, 5b show the displacement of the proof mass with responding to accelerations in the X and Y directions respectively.

DETAILED DESCRIPTION

The present invention relates generally to accelerometers and more specifically to multiple axis accelerometers. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention provides for the integration of an electronics substrate with a second substrate containing the sensing proof mass. The proof mass is suspended in such a way as to be sensitive to acceleration forces in three mutually orthogonal directions namely X, Y, and Z, where Z is defined as the direction normal to the substrate. The wafer level assembly and packaging have been described in, for example, U.S. Pat. No. 6,892,575, entitled "X-Y axis Dual Mass Tuning Fork Gyroscope with Vertically Integrated Electronics and Wafer-Scale Hermetic Packaging", assigned to the assignee of the present application and incorporated by reference in its entirety herein. This assembly approach provides a cost effective means to simultaneously protect the movable sensing element and to integrate the low noise electronics. The electronic circuitry is fabricated on a dedicated electronics silicon substrate and then assembled on to the sensing element substrate using a metal bonding technique. This technique has also been disclosed in Publication No. U.S.2005/0 170656 entitled "Vertical integration of a MEMS structure with electronics in a hermetically sealed cavity", assigned to the assignee of the present application and incorporated in its entirety herein. This application describes a low temperature process that does not damage or compromise the electronic circuitry. A plurality of these transducers are assembled in this manner at the wafer level where hundreds to thousands are produced simultaneously. A small size form factor is achieved by the vertical integration of the sensing element with its sensing circuit.

To describe the features of the present invention in more detail, refer now to the following discussion in conjunction with the accompanying figures.

Figure 1:
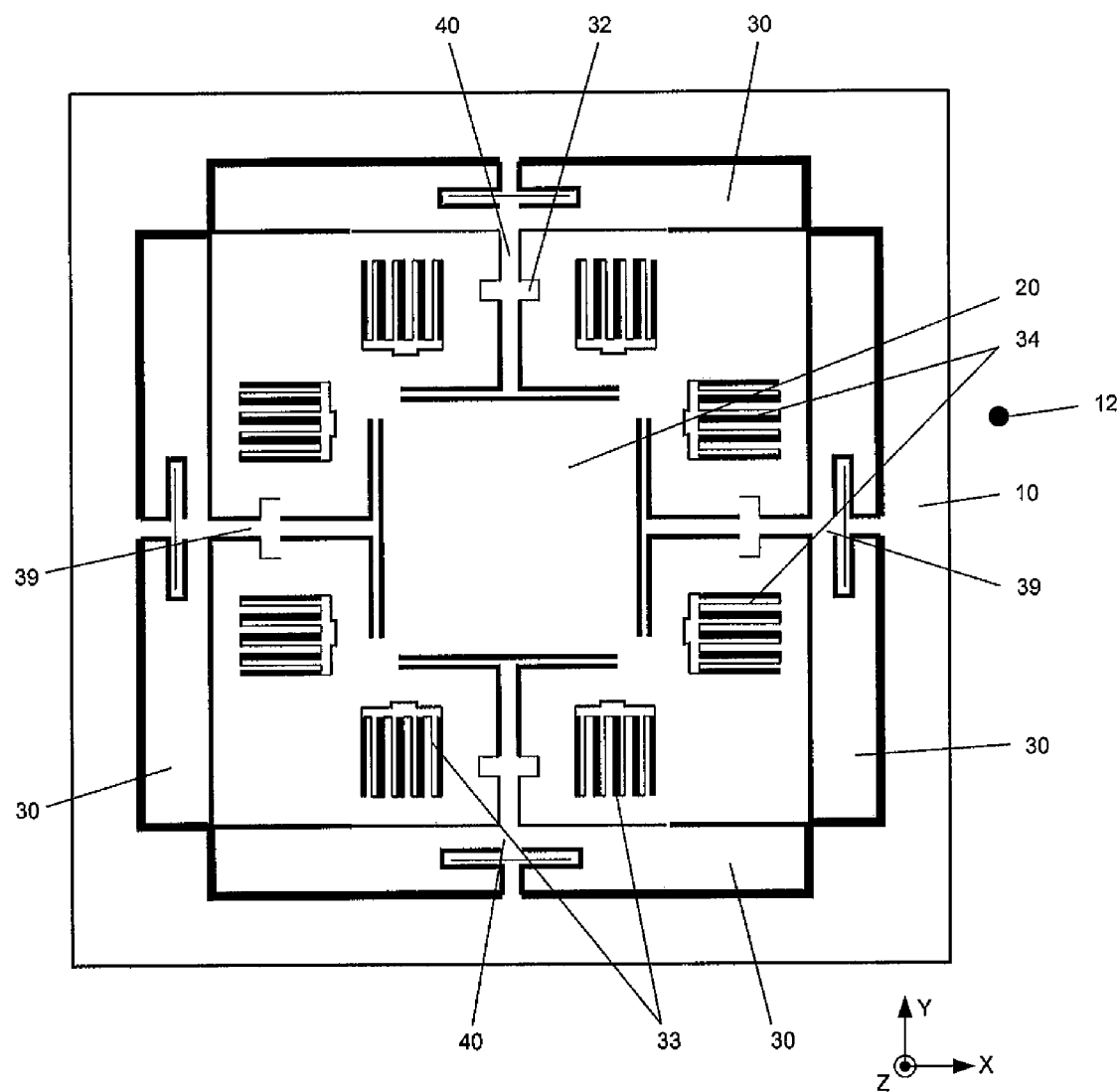
FIG. 1 and FIG. 2 are a view of a three axis accelerometer in accordance with the present invention.
Figure 2:
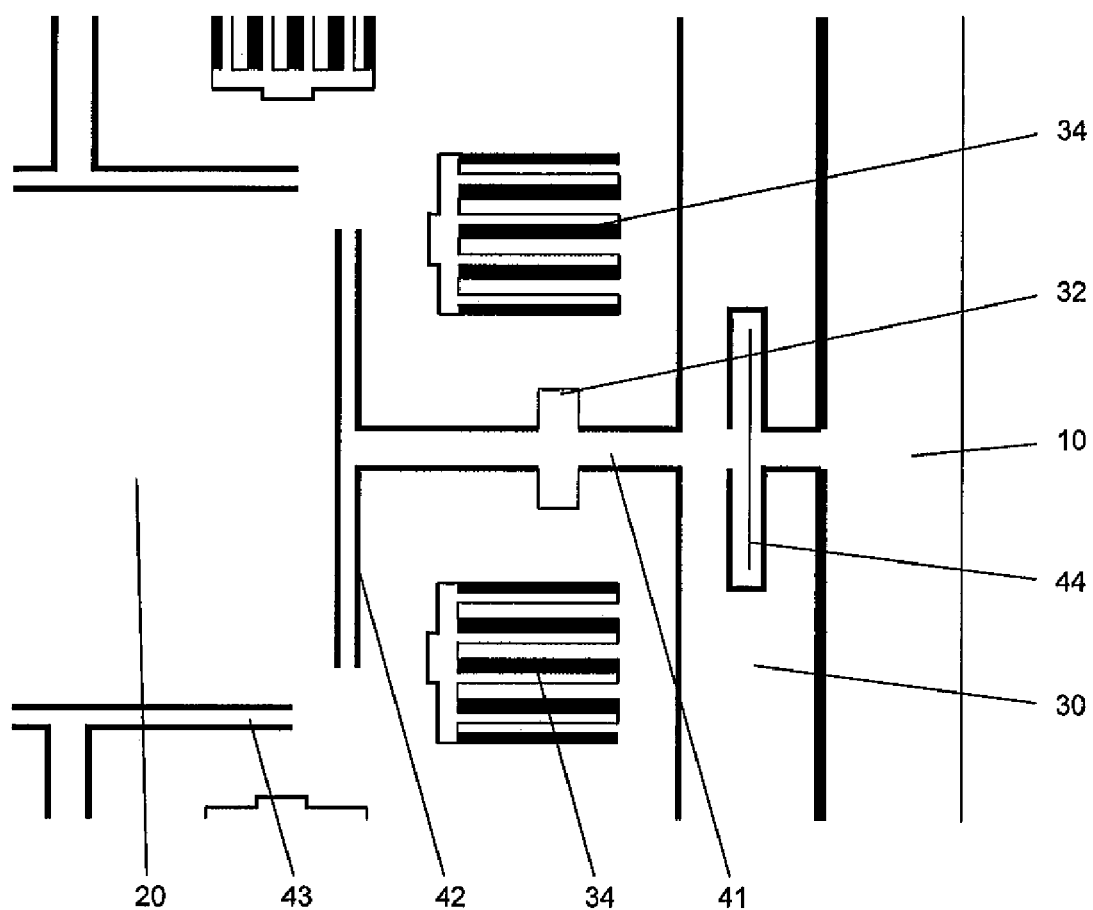
Figure 3:
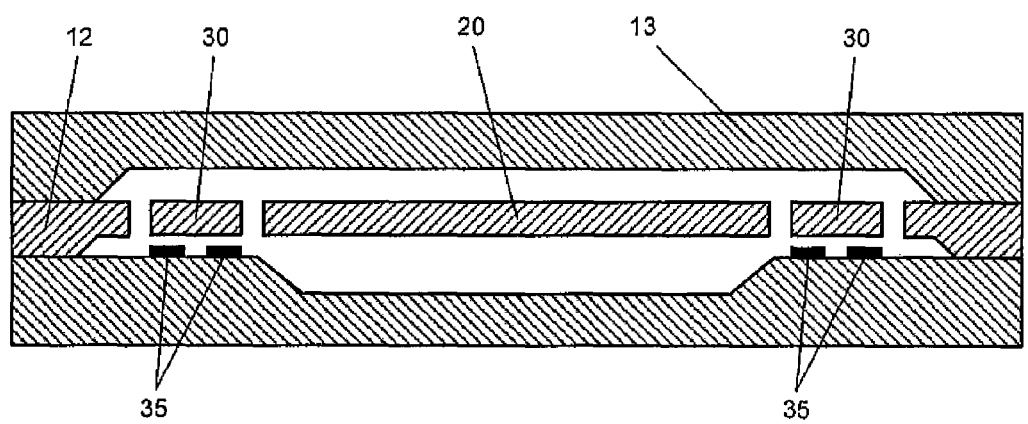
FIG. 3 is a cross-sectional view of a sensor element and its wafer construction in accordance with the present invention.
Figure 5A:
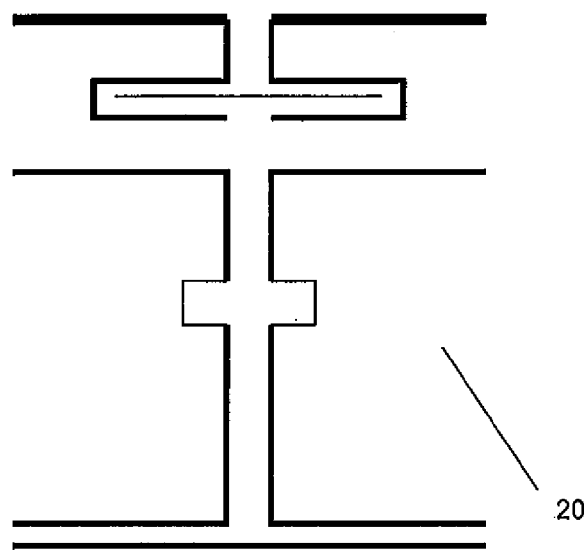
Figure 5B:
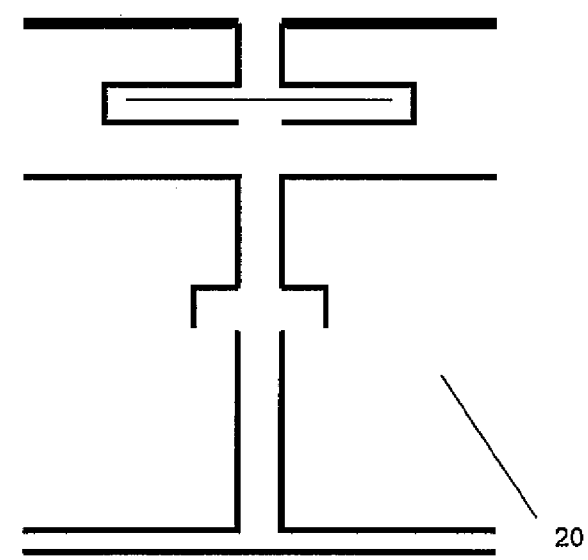

FIGS. 1 and 2 are a view of a three axis accelerometer in accordance with the present invention. FIG. 3 is a cross-sectional view of a sensor element and its wafer construction in accordance with the present invention. The sensing element comprises a single proof mass 20 that is suspended from a planar base 10 in such a manner as to allow for motion in the three orthogonal directions, namely X, Y, and Z. A set of linkages 40 work cooperatively to allow both X and Y motion in the plane and reject other non-orthogonal motions. Each linkage 40 subassembly comprises an inner pivot 42, 43 and an outer pivot 44 on each end of a lever arm 41 connecting the two pivots and a paddle 30 that is rigidly attached to the linkage 41. The proof mass 20 is symmetrical along two axes and its motion in the plane of the base is sensed by fixed sensing structures 33, 34 disposed in a manner to detect the motion induced by acceleration in the X and Y directions. FIGS. 4a, 4b and 5a, 5b show the displacement of the proof mass when responding to accelerations in the X and Y directions respectively. The sensing structures 33, 34 comprise a plurality of electrodes that are fixed to the base 10 and capacitively sense the displacement of the proof mass in response to in-plane accelerations. These capacitive sense elements can be of the form of parallel plates or interdigitated comb fingers.

The response to Z directional acceleration is accomplished by the use of the paddles 30 which are attached to the proof mass suspension linkage. Four paddles are shown along each edge of the substantially square proof mass. It is noted that although four paddles are utilized in this embodiment, one of ordinary skill in the art readily recognizes that any number of paddles can be used and their use would be within the spirit and scope of the present invention. As the proof mass 20 responds in a substantially translational movement, the linkage 40 and rigidly attached paddle 30 undergo an out of plane rotation. Depending on the orientation to the proof mass 20 the paddles 30 rotate about the X or Y axis. Electrodes 35 disposed on a reference wafer define capacitors to sense this rotation. By placing electrically isolated electrodes on either side of the rotation axis of the paddle, a differential capacitive sensing transducer is formed. This signal is a representation of the Z- acceleration.

Differential Sensing

In the two mutually perpendicular directions that are parallel to the substrate, the sensing structures are disposed in such a manner such that for each direction a differential capacitance change is achieved. For each motion direction, the proof masses will cause one capacitor to increase with a decrease in separation and a second to decrease in capacitance with an increase in distance. A plurality of capacitors will increase the amount of electronic signal. These capacitors are connected in such a manner to create the differential capacitance sensor.

Figure 6:
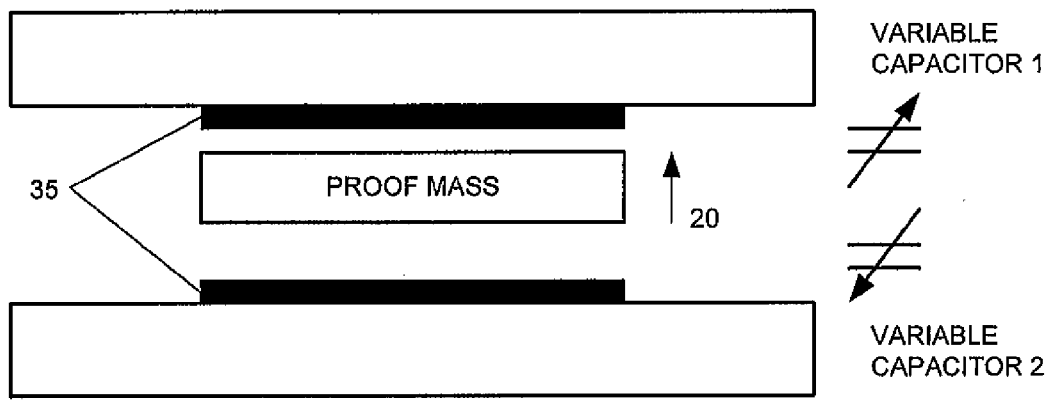
FIG. 6 shows a typical concept utilizing two electrodes each of which oppose each side of the proof mass.

For the third direction, Z, normal to the substrate, a typical concept shown in FIG. 6 utilizes two electrodes 35 each of which oppose each side of the proof mass 20. This enables differential sensing but is very difficult to implement in a micromachining process. Those skilled in the art can recognize that this would require a complex multilayer fabrication process or a multi-substrate process where the proof mass substrate is symmetrically opposed by a substrate with a sensing electrode on its surface. A further requirement is that these opposing surfaces should be substantially symmetrical to which the distances and alignment to the proof mass are equal.

Figure 7:
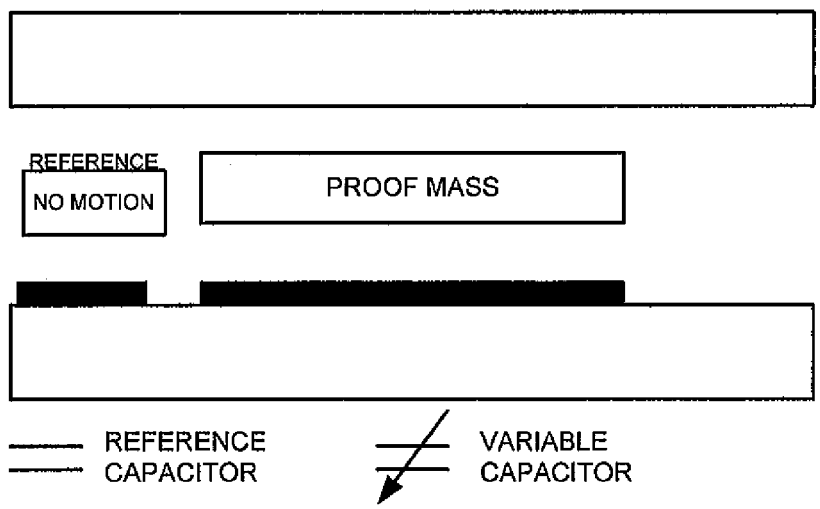
FIG. 7 shows a more manufacturing friendly configuration where one part of the differential sense is a reference capacitor.

A more manufacturable friendly configuration is shown in FIG. 7 where one part of the differential sensor is a reference capacitor where the capacitance is constant because there is no motion. In this approach only one side of the proof mass 20 and base 10 has an opposing electrode.

Figure 8A:
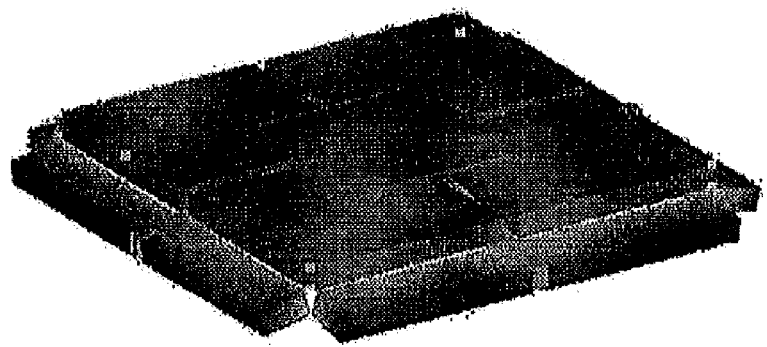
FIG. 8 shows how the electrode plates pivot in response to the proof mass motion as the proof mass is acted on by accelerating the sensor in the Z-direction.
Figure 8B:
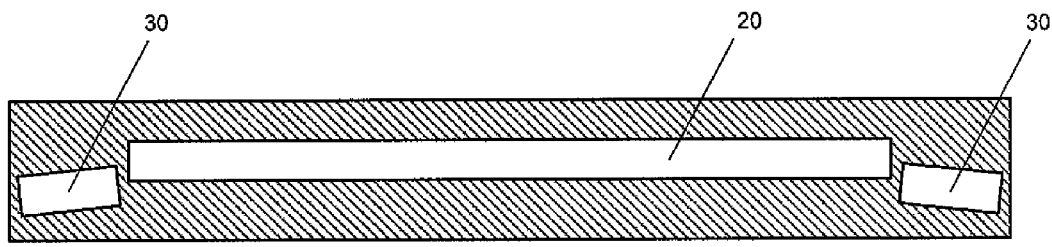
Figure 9:
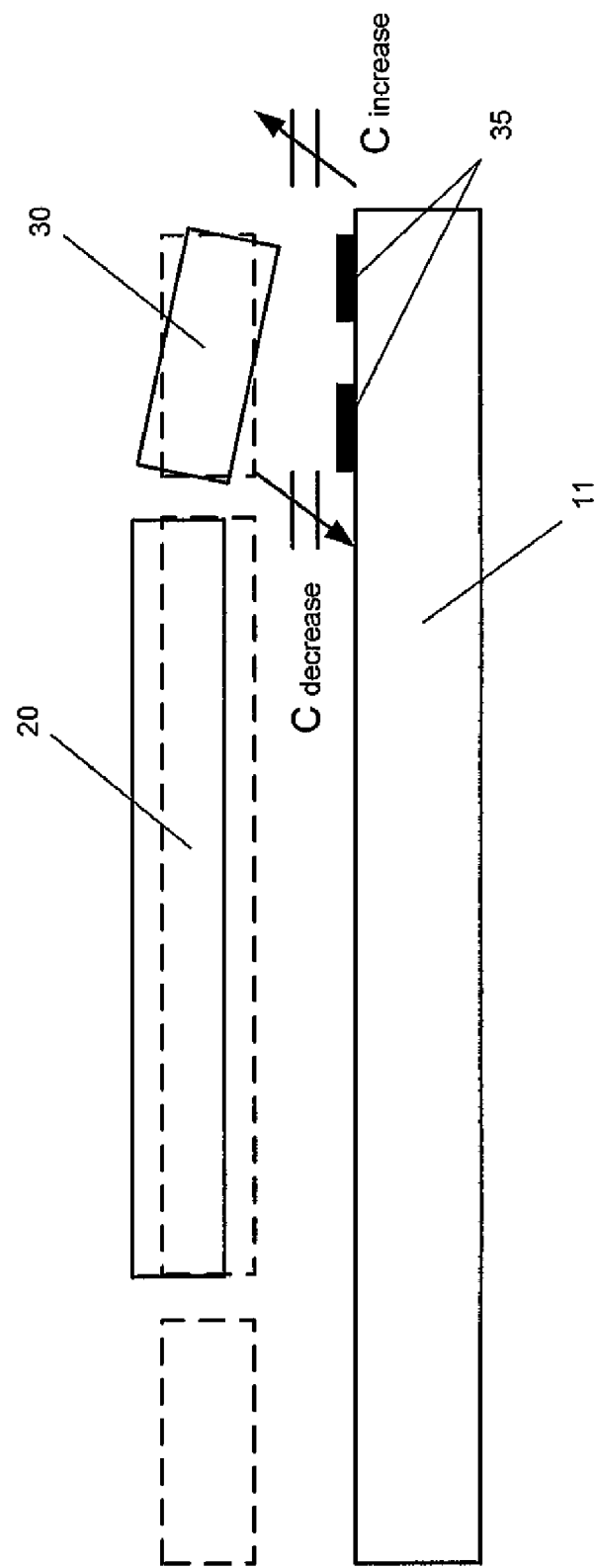
FIG. 9 depicts sensing electrodes that are placed on the reference wafer.

A system and method in accordance with the present invention provides for differential sensing of Z directed acceleration by the use of a plurality of additional paddles 30 (in this case 4). As the proof mass is acted on by accelerating the sensor in the Z- direction the electrode plates (or paddles 30) pivot in response to the proof mass motion as shown in FIG. 8. Sensing electrodes 35 that are placed on the electronics substrate provide for differential capacitance sensing to provide equal and opposite capacitance changes. FIG. 9 depicts sensing electrodes 35 that are placed on the reference wafer 11. These sensing electrodes 35 and the rotated paddle 30 comprise a transducer providing a differential capacitance sensing means. Only the proof mass surface that is opposed by the electronics substrate is sensed.

Over-Travel Protection Against Shock

One of the key performance parameters for accelerometers is their shock survivability. Typically the mechanical sensitivity to acceleration and shock performance are competing parameters. A design is then optimized that considers sensitivity requirement and shock performance. A system and method in accordance with the present invention comprises over-travel protection to enhance shock survivability without compromising sensitivity.

Figure 10:
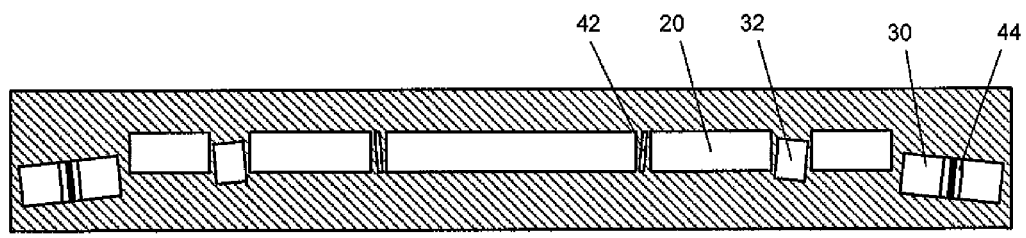
FIG. 10 illustrates an over-travel mechanism for use in the accelerator in accordance with the present invention.

FIG. 10 illustrates an over-travel mechanism for use in the accelerator in accordance with the present invention. As the lever arm rotates out of the plane due to proof mass acceleration, the over-travel stops 32 rotate as well and will contact the translating proof mass 20. The angular displacement will cause the separation of the electrode plate (or paddle 30) and proof mass 20 to be decreased. The initial separation and amount of contraction must be designed properly the necessary interface to prevent excessive motion and material critical stresses. The separation must comply with the capabilities of fabrication.

Motions that are parallel to the sensing element substrate are easily constrained by disposing of over-travel stops 32 that are fixed to the sensing element substrate base 10. Shock performance in both Z directions is achieved by the use lateral interference between the lever arm and proof mass.

A lever arm connects the two pivoting beams that connect the proof mass and pivoting electrode plate.

Among the advantages of the present invention are:

Reduced cost to manufacture related to a minimal 6-mask process which is half of a typical 12 mask process associated with piezoresistive devices;

Reduced cost to manufacture related to a shorter etch time to fabricate the proof mass. Proof mass thickness is substantially thinner 5-10× less. Additionally, the present invention does not face manufacturing challenges related to through wafer etching.

Improved manufacturing yields due to the absence of forming a critical thin flexure to support proof mass and piezoresistive transducer. The thickness of these flexures are difficult to control without using expensive silicon on insulator substrates or troublesome polysilicon deposited layers.

Wafer level packaging configuration enables low cost plastic packaging; piezoresistive devices are not sealed from the environment and must be assembled in a more cost intensive ceramic package. There are no means to protect movable elements at the wafer level prior to discrete packaging.

Added functionality and customization with integrated electronics.

Compared to other potential 3-axis capacitive accelerometers which are known to be commercially available, the present invention has the following advantages:

Ability to have differential sensing in all three axis directions.

Compatible fabrication method with rate of rotation sensors (gyros) for fully integrated inertial measurement units (IMU).

Added functionality and customization with integrated electronics.

Improved noise performance over other bulk silicon devices due to integrated electronics.

Improved sensitivity over electronically integrated surface micromachined accelerometers due to greater proof mass thickness.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A sensor for measuring acceleration in three mutually orthogonal X, Y, and Z directions, the sensor comprising:
    a first substrate including
        a base which is substantially parallel to a X-Y sensing plane;
        a proof mass disposed in the X-Y sensing plane and constrained to move substantially in the X, Y, and Z directions by a linkage, the proof mass being responsive to accelerations in the X, Y and Z directions;
        a pivot on the linkage;
        a paddle disposed in the X-Y sensing plane and attached to the linkage, the paddle being separate from the proof mass and being configured to rotate about a X axis or a Y axis along the pivot responsive to Z directional acceleration of the proof mass; and
        a first plurality of electrodes fixed to the base and configured to respectively sense displacement of the proof mass responsive to X directional acceleration and Y directional acceleration of the proof mass; and
    a second substrate including a second plurality of electrodes, the second plurality of electrodes configured to sense the Z directional acceleration of the proof mass.

2. The sensor of claim 1, wherein the first substrate comprises a plurality of paddles disposed in the X-Y sensing plane.

3. The sensor of claim 1, wherein the second plurality of electrodes are configured to sense the Z directional acceleration of the proof mass based on the rotation of the paddle about the X axis or the Y axis.

4. The sensor of claim 3, wherein the second plurality of electrodes comprise electrically isolated electrodes placed on opposite sides of a rotation axis of the paddle.

5. The sensor of claim 4, wherein the electrically isolated electrodes form a differential capacitive sensing transducer.

6. The sensor of claim 5, wherein the electrically isolated electrodes are all only on one side of the proof mass.

7. The sensor of claim 6, wherein the differential capacitive sensing transducer provides substantially equal and opposite capacitance changes.

8. The sensor of claim 6, wherein the differential capacitive sensing transducer comprises a reference capacitor having a constant capacitance.

9. The sensor of claim 5, wherein first plurality of electrodes are configured to respectively capacitively sense displacement of the proof mass responsive to X directional acceleration and Y directional acceleration of the proof mass.

10. The sensor of claim 9, wherein the first plurality of electrodes comprise a differential sense capacitor.

11. The sensor of claim 10, wherein the proof mass is substantially square in shape.

12. The sensor of claim 11, further comprising a first over-travel stop disposed in the X-Y sensing plane, the first over-travel stop to limit displacement of the proof mass in the X direction.

13. The sensor of claim 12, further comprising a second over-travel stop disposed in the X-Y sensing plane, the second over-travel stop limit displacement of the proof mass in the Y direction.

14. The sensor of claim 13, wherein the first over-travel stop and the second over-travel stop further limit displacement of the proof mass in the Z direction.

15. A sensor for measuring acceleration in three mutually orthogonal X, Y, and Z directions, the sensor comprising:
    a first substrate including
        a base which is substantially parallel to a X-Y sensing plane;
        a proof mass disposed in the X-Y sensing plane and constrained to move substantially in the X, Y, and Z directions by a linkage, the proof mass being responsive to accelerations in the X, Y and Z directions;
        a pivot on the linkage;
        a paddle disposed in the X-Y sensing plane and attached to the linkage, the paddle being separate from the proof mass and being configured to rotate about a X axis or a Y axis along the pivot responsive to Z directional acceleration of the proof mass; and
        a first plurality of electrodes fixed to the base and configured to respectively sense displacement of the proof mass responsive to X directional acceleration and Y directional acceleration of the proof mass, and
    a silicon reference wafer comprising a second substrate, the silicon reference wafer having a top surface attached to the base of the first substrate, the second substrate including a second plurality of electrodes configured to sense the Z directional acceleration of the proof mass,
    wherein the first substrate and the base are etched from a single silicon sensor wafer.

16. The sensor of claim 15, wherein the second plurality of electrodes are configured to sense the Z directional acceleration of the proof mass based on the rotation of the paddle about the X axis or the Y axis.

17. The sensor of claim 15, wherein the silicon reference wafer comprises CMOS electronics electrically connected to the first plurality of electrodes.

18. The sensor of claim 15, wherein the reference wafer includes a recess to accommodate motion of the proof mass.

19. The sensor of claim 18, wherein the first substrate comprises a plurality of paddles disposed in the X-Y sensing plane.

20. The sensor of claim 15, wherein the second plurality of electrodes are configured to sense the Z directional acceleration of the proof mass based on the rotation of the paddle about the X axis or the Y axis.

21. The sensor of claim 20, wherein the second plurality of electrodes comprise electrically isolated electrodes placed on opposite sides of a rotation axis of the paddle.

22. The sensor of claim 21, wherein the electrically isolated electrodes form a differential capacitive sensing transducer.

23. The sensor of claim 22, wherein the electrically isolated electrodes are all only on one side of the proof mass.

24. The sensor of claim 23, wherein the differential capacitive sensing transducer provides substantially equal and opposite capacitance changes.

25. The sensor of claim 23, wherein the differential capacitive sensing transducer comprises a reference capacitor having a constant capacitance.

26. The sensor of claim 22, wherein the first plurality of electrodes are configured to respectively capacitively sense displacement of the proof mass responsive to X directional acceleration and Y directional acceleration of the proof mass.

27. The sensor of claim 26, wherein the first plurality of electrodes comprise a differential sense capacitor.

28. The sensor of claim 27, wherein the proof mass is substantially square in shape.

29. The sensor of claim 28, further comprising a first over-travel stop disposed in the X-Y sensing plane, the first over-travel stop to limit displacement of the proof mass in the X direction.

30. The sensor of claim 29, further comprising a second over-travel stop disposed in the X-Y sensing plane, the second over-travel, stop to limit displacement of the proof mass in the Y direction.

31. The sensor of claim 30, wherein the first over-travel stop and the second over-travel stop further limit displacement of the proof mass in the Z direction.

32. A sensor for measuring acceleration in three mutually orthogonal X, Y, and Z directions, the sensor comprising:
   a first including
      a base which is substantially parallel to a X-Y sensing plane;
      a proof mass disposed in the X-Y sensing plane and constrained to move substantially in the X, Y, and Z directions by a linkage, the proof mass being responsive to accelerations in the X, Y and Z directions;
      a pivot on the linkage;
      a paddle disposed in the X-Y sensing plane and attached to the linkage, the paddle being separate from the proof mass and being configured to rotate about a X axis or a Y axis alone the pivot responsive to Z directional acceleration of the proof mass; and
      a first plurality of electrodes fixed to the base and configured to respectively sense displacement of the proof mass responsive to X directional acceleration and Y directional acceleration of the proof mass; and
   a silicon reference wafer comprising a second substrate, the silicon reference wafer having a top surface attached to the base of the first substrate, the second substrate including a second plurality of electrodes configured to sense the Z directional acceleration of the proof mass,
   wherein the first substrate and the base are etched from a single silicon sensor wafer; and
   a cap wafer having a bottom surface attached to the base of the first substrate.

33. The sensor of claim 32 wherein the silicon reference wafer comprises CMOS electronics electrically connected to the first plurality of electrodes.

34. The sensor of claim 33, wherein the cap wafer comprises a recess to accommodate motion of the proof mass.

35. The sensor of claim 33, wherein:
   the cap wafer is hermetically attached to the base; and
   the silicon reference wafer is hermetically attached to the base.

36. The sensor of claim 33, wherein a gas pressure within a hermetic enclosure formed by the base, the cap wafer, and the silicon reference wafer is substantially different from atmospheric pressure.

37. The sensor of claim 33, wherein:
   the cap wafer is hermetically attached to the base with a Si to SiO2 fusion bond; and
   the silicon reference wafer is hermetically attached to the base with a metal seal.

38. The sensor of claim 32, wherein the first substrate comprises a plurality of paddles disposed in the X-Y sensing plane.

39. The sensor of claim 32, wherein the second plurality of electrodes are configured to sense the Z directional acceleration of the proof mass based on the rotation of the paddle about the X axis or the Y axis.

40. The sensor of claim 39, wherein the second plurality of electrodes comprise electrically isolated electrodes placed on opposite sides of a rotation axis of the paddle.

41. The sensor of claim 32, wherein the electrically isolated electrodes form a differential capacitive sensing transducer.

42. The sensor of claim 41, wherein the electrically isolated electrodes are all only on one side of the proof mass.

43. The sensor of claim 42, wherein the differential capacitive sensing transducer provides substantially equal and opposite capacitance changes.

44. The sensor of claim 42, wherein the differential capacitive sensing transducer comprises a reference capacitor having a constant capacitance.

45. The sensor of claim 41, wherein the first plurality of electrodes are configured to respectively capacitively sense displacement of the proof mass responsive to X directional acceleration and Y directional acceleration of the proof mass.

46. The sensor of claim 45, wherein the first plurality of electrodes comprise a differential sense capacitor.

47. The sensor of claim 46, wherein the proof mass is substantially square in shape.

48. The sensor of claim 47, further comprising a first over-travel stop disposed in the X-Y sensing plane, the first over-travel stop to limit displacement of the proof mass in the X direction.

49. The sensor of claim 48, further comprising a second over-travel stop disposed in the X-Y sensing plane, the second over-travel stop to limit displacement of the proof mass in the Y direction.

50. The sensor of claim 49, wherein the first over-travel stop and the second over-travel stop further limit displacement of the proof mass in the Z direction.

* * * * *